United States Patent [19]
Kitano et al.

[11] Patent Number: 6,022,493
[45] Date of Patent: Feb. 8, 2000

[54] LIQUID-CRYSTAL COMPOSITION FOR LIQUID-CRYSTAL DISPLAY ELEMENTS AND PROCESS FOR PRODUCING THE COMPOSITION

[75] Inventors: Kisei Kitano; Toshiharu Suzuki; Susumu Koyama, all of Chiba, Japan

[73] Assignee: Chisso Corporation, Osaka-fu, Japan

[21] Appl. No.: 08/981,046

[22] PCT Filed: Jun. 17, 1996

[86] PCT No.: PCT/JP96/01656

§ 371 Date: Dec. 11, 1997

§ 102(e) Date: Dec. 11, 1997

[87] PCT Pub. No.: WO97/00302

PCT Pub. Date: Jan. 3, 1997

[30] Foreign Application Priority Data

Jun. 16, 1995 [JP] Japan ................................ 7-174088

[51] Int. Cl.[7] .................... C09K 19/30; C09K 19/12; C09K 19/20
[52] U.S. Cl. .............. 252/299.63; 252/299.66; 252/299.67
[58] Field of Search .................. 252/299.63, 299.66, 252/299.67

[56] References Cited

U.S. PATENT DOCUMENTS

| | | | |
|---|---|---|---|
| 5,422,035 | 6/1995 | Bartmann et al. | 252/299.01 |
| 5,480,581 | 1/1996 | Plach et al. | 252/299.63 |
| 5,487,845 | 1/1996 | Reiffenrath et al. | 252/299.63 |
| 5,496,499 | 3/1996 | Poetsch et al. | 252/299.66 |
| 5,520,846 | 5/1996 | Plach et al. | 252/299.63 |
| 5,523,127 | 6/1996 | Ohnishi et al. | 428/1 |
| 5,536,442 | 7/1996 | Reiffenrath et al. | 252/299.01 |
| 5,571,449 | 11/1996 | Bartmann et al. | 252/299.6 |
| 5,616,284 | 4/1997 | Hittich et al. | 252/299.63 |
| 5,626,793 | 5/1997 | Reiffenrath et al. | 252/299.63 |
| 5,641,429 | 6/1997 | Reiffenrath et al. | 252/299.61 |
| 5,653,912 | 8/1997 | Nakagawa et al. | 252/299.01 |
| 5,670,085 | 9/1997 | Miyazawa et al. | 252/299.01 |
| 5,716,543 | 2/1998 | Schlosser et al. | 252/299.63 |
| 5,718,840 | 2/1998 | Plach et al. | 252/299.66 |
| 5,730,904 | 3/1998 | Bartmann et al. | 252/299.63 |

Primary Examiner—C. H. Kelly
Attorney, Agent, or Firm—Wenderoth, Lind & Ponack, L.L.P.

[57] ABSTRACT

A liquid crystal composition is disclosed which comprises at least one liquid crystalline compound having a total number of carbon of 4 to 24 in the portions of acyclic hydrocarbon, and the average value of the total number of carbon atoms in the liquid crystalline compound in the liquid crystal composition is 5 or more. A liquid crystal display (particularly, AM-LCD) having higher voltage holding ratio than that of conventional ones can be achieved.

2 Claims, 1 Drawing Sheet

Average alkyl chain length
[number of carbon atoms]

LIQUID-CRYSTAL COMPOSITION FOR LIQUID-CRYSTAL DISPLAY ELEMENTS AND PROCESS FOR PRODUCING THE COMPOSITION

TECHNICAL FIELD

The present invention relates to a liquid crystal composition for a liquid crystal display device, a process for producing the liquid crystal composition, and a liquid crystal display device utilizing the liquid crystal composition.

BACKGROUND ART

In active matrix displays (AM-LCD) having an integrated non-linear device as a switching device typified by a non-linear two terminal device such as a variable resistor or diode, and a non-linear three terminals device such as a thin film transistor (TFT), liquid crystal compositions having a high voltage holding ratio are required compared with conventional displays of passive modes such as a twisted nematic mode, guest host mode, super twisted nematic mode, and SBE (Super Birefringence Effect) mode. AM-LCD utilizing a liquid crystal composition having a low voltage holding ratio can not provide a high quality display, since it causes phenomena such as spotting, flickering, and lowering in contrast. Besides, the lowering of voltage holding ratio under the environment in which an AM-LCD is used raises other problems.

Since, in many instances, liquid crystal materials, as a single compound, used for displays do not satisfy various requirements for properties such as temperature range of liquid crystal phase, viscosity, optical anisotropy, dielectric anisotropy, elastic constants ($K_{11}$, $K_{22}$, $K_{33}$), driving voltage, chemical and physical stability and long term stability of them, consumptive electric current, specific resistance, voltage holding ratio, and temperature dependency of these parameters which meet to various displays, a mixture of a plural number of compounds (hereinafter, sometimes, referred to as liquid crystal composition) is generally used.

Heretofore, it is known that the chemical structure of liquid crystalline compounds used for displays is usually a rod-like, and that the chemical structure can roughly be divided into a terminal group portion, ring structure portion, and the portion of bonding group which links a ring with another ring. Ring bonding group portion may sometimes have lateral substitutents.

As the literature which shows such facts, for example, the following can be mentioned:

Literature 1: Takashi INUKAI, Liquid Crystals-Fundamentals, (co-editors; Kohji OKANO and Shunsuke KOBAYASHI), pp. 178–204, published by Baifuhkan Co., Ltd. (1985)

Literature 2: Shunsuke TAKENAKA, Liquid Crystal Materials (edited by Narikazu KUSABAYASHI), pp. 67–94, published by Kohdansha Co., Ltd. (1991)

Literature 3: V. Vill, Landolt-Boernstein/New Series Group IV Volume 7 a–d Liquid Crystals, Springer-Verlag (1992)

Literature 4: D. Demus, H. Demus, H. Zaschke, Fluessige Kristalle in Tabellen, VEB Deutscher Verlag fuer Grundstoff Industrie, Leipzig (1976)

Literature 5: D. Demus, H. Zaschke, Fluessige Kristalle in Tabellen II, VEB Deutscher Verlag fuer Grundstoff Industrie, Leipzig (1984), In more specific explanation, liquid crystalline compounds used for displays are organic compounds having the structure expressed by the following general formula (2)

$$R—(A^1—Z)_n—A^2—X \qquad (2)$$

wherein R represents a group in a chain form, $A^1$ and $A^2$ represent a group in a ring form, Z represents covalent bond or a bonding group (bridge), n is an integer of 1 or greater, and X represents an electron attractive group or a group in a chain form.

Generally, R is called "side chain", the portion of —($A^1$—Z)$_n$— $A^2$— is called "core", and X is called "terminal group". When the terminal group X is an electron attractive group, it is called "polar group", and when this is a chain form group, it is called another "side chain". In some cases, the ring of the "core" has some substitutents such as halogen at its side position, and such substituents are called "lateral group". While n is an integer of 1 or greater, liquid crystalline compounds in which n is 4 or greater are rare. Also, when n is 2 or greater, in many cases, ($A^1$—Z) is not the repetition of the same structure.

As the side chain corresponding to R and X, an alkyl group, alkoxy group, alkenyl group, alkenyloxy group, and oxalkyl group are typical ones. Whereas these groups are usually straight chains, sometimes they are branched. As the polar group corresponding to X, cyano group, a halogen, —$CF_3$, —$OCF_3$, —$OCHF_2$, —$OC_2F_5$, —$OCF_2CHF_2$, and —NCO are typical ones.

As the ring form group $A^1$ and $A^2$ in the core, while six-membered rings such as 1,4-phenylene, trans-1,4-cyclohexylene, 1,3-dioxane-trans-2,5-diyl, and pyrimidine-2,5-diyl are typical ones, five-membered rings, four-membered rings, and condensed rings such as naphthalene are also known. In the case of aromatic rings such as 1,4-phenylene and pyrimidine-2,5-diyl, hydrogen atoms at a side position may sometimes be substituted with a polar group such as a halogen.

As the case in which Z is a bridge group, groups in which a main chain is composed of an even number of atoms, such as —$CH_2CH_2$—, —$CH_2O$—, —$OCH_2$—, —COO—, —OCO—, —$CF_2O$—, —$OCF_2$—, and —$(CH_2)_4$— are known.

Also, there is a case in which hydrogen atom in the compound is substituted with an isotope such as deuterium atom.

Liquid crystalline compounds are classified by their value of dielectric anisotropy ($\Delta\in$), and the compounds having a positive value of $\Delta\in$ are called P type and those having a negative or small value of $\Delta\in$ are called N type. Compounds expressed by general formula (2) in which X is a polar group are P type, and the compounds in which X is a side chain are N type.

Accordingly, the molecular structure of liquid crystalline compounds can be designed by combining various partial structures, and liquid crystal compositions have been designed by selecting and mixing compounds according to the purpose of their use.

In a conventional structure design of liquid crystalline compounds, the viewpoint considered to be most important is the structure of the polar group and core which strongly affect the physical properties of liquid crystal materials for displays. In AM-LCD, elevation of voltage holding ratio has been required, and one of the physical properties which affects the voltage holding ratio is considered to be specific resistance. That is, liquid crystal materials having a high specific resistance are considered to be necessary for AM-LCD. It is known that as liquid crystal materials to be used for AM-LCD, the materials comprising the compounds having —F, —Cl, —$OCF_3$, —$OCHF_2$, —$CF_3$, —$OCF_2CHF_2$, and —$OC_2F_5$ as polar group or lateral groups are preferable by their higher specific resistance than the materials comprising the compounds having cyano group. Accordingly, methods for elevating specific resistance, by paying attention to electron attractive groups, have been applied in prior art. However, the prior art wherein attention is directed to electron attractive groups is unsatisfactory in obtaining liquid crystal compositions suitable for AM-LCD having a higher voltage holding ratio.

DISCLOSURE OF THE INVENTION

As a result of the research conducted by the present inventors, it has been found that the voltage holding ratio of AM-LCD depends not only the polar group and lateral group in the constituent molecules of liquid crystal materials to be used, but also largely on the total number of carbon atoms in the portions of acyclic hydrocarbon in a side chain or in the part of a bridge group, leading to the achievement of the present invention.

Even if the chemical structures at the portions other than that of acyclic hydrocarbon in liquid crystalline compounds were the same, AM-LCD utilizing a liquid crystal composition containing more compounds having a large total number of carbon atoms in the portions of acyclic hydrocarbon preferably have a higher voltage holding ratio. Liquid crystal compositions containing more compounds having such a high voltage holding ratio desirably have a higher voltage holding ratio.

Invention claimed by the present application has the following aspects:

(1) A liquid crystal composition comprising at least one liquid crystalline compound expressed by the following general formula (3) and having a total number of carbon atoms of 4 to 24 in the portions of acyclic hydrocarbon in a side chain, in an amount of 70% by weight or more, in the liquid crystal composition, and the average value of the total number of carbon atoms in the liquid crystalline compound in the liquid crystal composition is 5 or more.

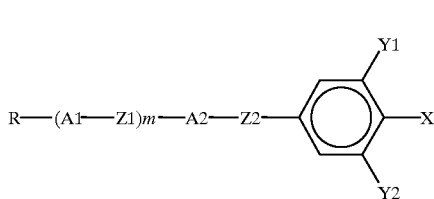

(3)

wherein R represents a chain group having 1 to 12 carbon atoms in the portion of hydrocarbon, A1 and A2 independently represent trans-1,4-cyclohexylene group, or 1,4-phenylene group which may be unsubstituted or lateral position of which may be substituted with fluorine, Z1 and Z2 independently represent single bond, or a bridge group a main chain of which is composed of an even number of atoms, X represents —F, —Cl, —CF$_3$, —OCF$_3$, —OCHF$_2$, —OC$_2$F$_5$, or—OCF$_2$CHF$_2$, Y1 represents flourine atom, Y2 represents hydrogen atom or fluorine atom, and m is 0, 1, 2, or 3.

(2) The liquid crystal composition recited in the aspect (1) mentioned above wherein the portions of the acyclic hydrocarbon are an alkyl group or alkoxy group.

(3) A liquid crystal display utilizing a liquid crystal composition recited in either aspect (1) or (2) mentioned above.

(4) A liquid crystal display of active matrix mode utilizing a liquid crystal composition recited in either aspect (1) or (2) mentioned above.

(5) A liquid crystal composition comprising at least one liquid crystalline compound represented by the following general formula (1) and having a total number of carbon atoms of 4 to 24 in the portions of acyclic hydrocarbon in a side chain, in an amount of 70% by weight or more in the liquid crystal composition, and the average value of the total number of carbon atoms in the liquid crystalline compound in the liquid crystal composition is 5 or more

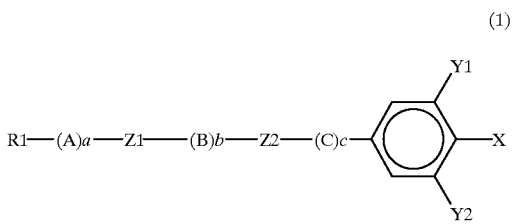

(1)

wherein R1 represents an alkyl group or alkoxy group having 4 to 24 carbon atoms; A, B, and C independently represent 1,4-phenylene, trans-1,4-cyclohexylene, 1,3-dioxane-2,5-diyl, pyrimidine-2,5-diyl, or pyridine-2,5-diyl provided that when A, B, and C are 1,4-phenylene, 1 to 4 hydrogen atoms of which may independently be substituted with F, Cl, OCF$_3$, or CF$_3$; a, b, and c are independently an integer of 0 to 3 provided that a+b±c≦3; Z1 and Z2 independently represent single bond, —COO—, or —C≡C—; X represents F, Cl, O(CH$_2$)$_n$CH$_l$F$_{3-l}$, (CH$_2$)$_n$CH$_l$F$_{3-l}$, or an alkyl or alkyloxy group having 1 to 24 carbon atoms provided that n is an integer of 0 to 4, and l is an integer of 0 to 2; and Y1 represents for Cl an Y2.

(6) The liquid crystal composition recited in the aspect (5) mentioned above wherein the liquid crystal composition has a CN point or SN point of −10° C. or lower, and a NI point of 60° C. or higher, and is composed of at least 7 liquid crystalline compounds, in which CN point represents crystal-nematic phase transition point, SN point represents smectic-nematic phase transition point, and NI point represents nematic-isotropic liquid phase transition point.

(7) A liquid crystal display utilizing a liquid crystal composition recited in either aspect (5) or (6) mentioned above.

(8) A liquid crystal display of active matrix mode utilizing a liquid crystal composition recited in either aspect (5) or (6).

(9) A process for producing a liquid crystal composition comprising selecting the liquid crystalline compounds mentioned above and their content by using, as a parameter, the number of carbon atoms in the portion of acyclic hydrocarbon in liquid crystalline compounds from which the liquid crystal composition is composed, within the range wherein the total number of carbon atoms in the portions of acyclic hydrocarbon in the liquid crystalline compounds is from 4 to 24, and the average value of the total number of carbon atoms in the portions of acyclic hydrocarbon in the liquid crystalline compounds in the liquid crystal composition is 5 or more, so that the voltage holding ratio of a cell of the liquid crystal is a prescribed value or higher when the cell was prepared by filling the liquid crystal composition.

(10) The process for producing a liquid crystal composition recited in the aspect (9) mentioned above wherein the liquid crystalline compounds are selected from the compounds expressed by the following general formula (4), and its content is 70% by weight or more

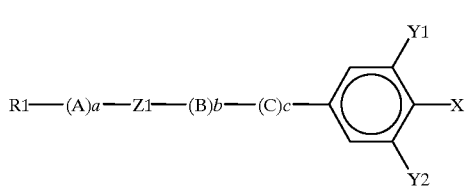
(4)

wherein R1 represents an alkyl group or alkoxy group having 4 to 24 carbon atoms, A, B, and C independently represent 1,4-phenylene, trans-1,4-cyclohexylene, 1,3-dioxane-2,5-diyl, pyrimidine-2,5-diyl, or pyridine-2,5-diyl group, when A, B, and C are 1,4-phenylene, 1 to 4 hydrogen atoms in the phenylene may independently be replaced by F, Cl, $OCF_3$, or $CF_3$, a, b, and c are independently an integer of from 0 to 3 provided that $a+b+c \leq 3$, Z1 and Z2 independently represent single bond, —COO—, —$CH_2CH_2$—, or —C≡C—, X represents F, Cl, $O(CH_2)_n CH_l F_{3-l}$, $(CH_2)_n CH_l F_{3-l}$, or an alkyl group or alkyloxy group having 1 to 24 carbon atoms wherein n is an integer of from 0 to 4 and l is an integer of from 0 to 2, and Y1 and Y2 independently represent H, F, or Cl.

(11) A liquid crystal composition comprising 70% by weight or more in total of seven or more kinds of the liquid crystalline compounds expressed by the following general formula (3) and having a total number of carbon atoms in a side chain of 4 to 24, average value of the total number of the carbon atoms in the liquid crystalline compounds in the liquid crystal composition being 5 or more

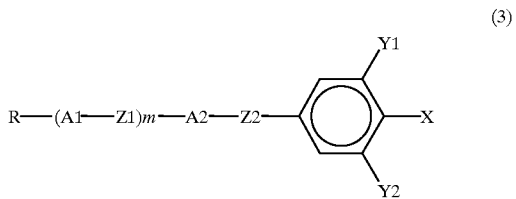
(3)

wherein R represents a chain group having 1 to 12 carbon atoms in the portions of hydrocarbon, A1 and A2 independently represent trans-1,4-cyclohexylene group or 1,4-phenylene group which phenylene group may be unsubstituted or lateral portion of which may be substituted with fluorine atom, Z1 and Z2 independently represent covalent bond or a bridge group main chain of which is composed of an even number of atoms, X represents —F, —$Cl_l$, —$CF_3$, —$OCF_3$, —$OCHF_2$, —$OC_2F_5$, or —$OCF_2CHF_2$, Y1 represents fluorine atom, Y2 represents hydrogen atom or fluorine atom, and m is 0, 1, 2, or 3, provided that the bridge group does not include —$(CH_2CH_2)_p$— wherein p is 1 or 2.

BEST MODE FOR CARRYING OUT THE INVENTION

Figure 1:
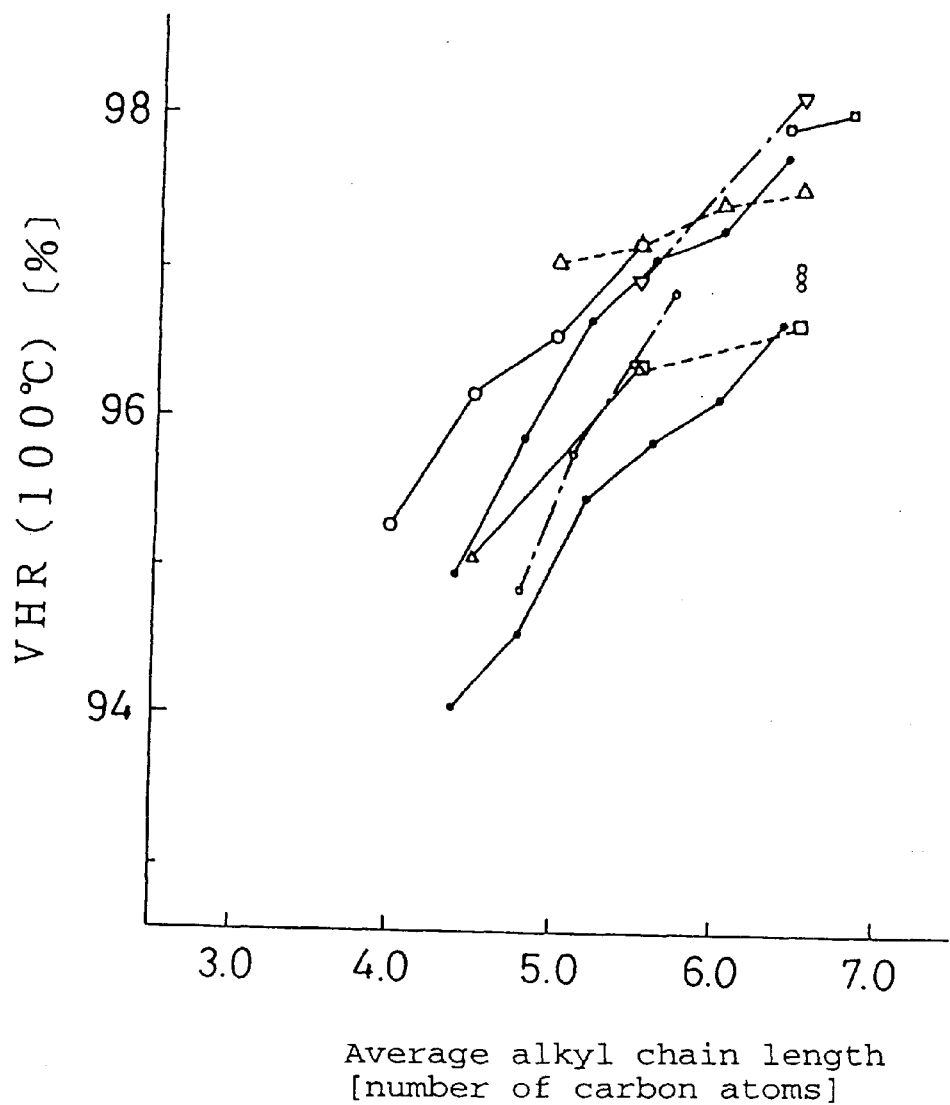
FIG. 1 is a graph showing the relationship between the average chain length of alkyl groups in various liquid crystal compositions in the present invention and voltage holding ratio (100° C.).

In the present invention, the carbon atom in the portions of acyclic hydrocarbon means the carbon atom having at least one hydrogen atom (CH group, $CH_2$ group, or $CH_3$ group), but the carbon atoms substituted with two or more halogen atoms (for example, —$CHF_2$ group), the carbon atom in carbonyl group, and the carbon atom linked to triple bond (—C≡C—) are excluded.

Liquid crystal molecules usually have at least one portion of acyclic hydrocarbon in their chemical structure. According to the present invention, liquid crystalline compounds suitable for liquid crystal displays of active matrix mode (AM-LCD) can be obtained by designing the molecule of liquid crystalline compounds while giving consideration of the balance between the number of carbon atom in the portions of acyclic hydrocarbon and characteristics other than voltage holding ratio, and further liquid crystal compositions which can satisfy even required characteristics other than voltage holding ratio can be provided by mixing liquid crystalline compounds having a high voltage holding ratio. Moreover, highly advanced displays can be provided by using a liquid crystal composition which has such a high voltage holding ratio and is excellent even in other characteristics.

Portion of acyclic hydrocarbon of liquid crystalline compounds exists in their side chain. However, when the compounds have a bridge group in the core, the portion exists also in the bridge group. When both ends of the molecules are side chains (N type), the portion exist at both ends. Groups which form the bridge are ones having a main chain which is composed of an even number of atoms.

Groups which form the side chain are straight, branched, or optically active chain groups. While the chain groups are principally alkyl groups, one or a plural number of not-adjacent —$CH_2$— may be substituted simultaneously or separately with —O— or —CH=CH— (trans). Besides, one or more hydrogen atoms in the alkyl groups or substituted alkyl groups may be substituted with fluorine atoms.

In preferable embodiments of the present invention, liquid crystal compositions contain 70% by weight or more of at least one liquid crystalline compound having a total number of carbon atoms of 4 to 24, preferably 5 to 12 in the portion of acyclic hydrocarbon existing in a side chain, and the average value of the total number of carbon atoms mentioned above in the liquid crystalline compound in the liquid crystal composition is 5 or more, preferably 6 or more; 8 or less.

When the total number of carbon atoms mentioned above is less than 4, or the average value of the total number of carbon atoms mentioned above is less than 5, voltage holding ratio of liquid crystal compositions sometimes can not sufficiently be elevated. Conversely, when the total exceeds 24, physical properties other than voltage holding ratio are adversely affected.

Among the embodiments of the present invention mentioned above, the case where the main component is composed of liquid crystalline compounds having a positive dielectric anisotropy (P type) is more preferable. This is because the liquid crystalline compounds of P type can reduce the driving voltage of displays.

However, there are many cases where liquid crystalline compounds having a negative dielectric anisotropy (N type) are used as component. Even in the cases where N type compounds are used, voltage holding ratio of liquid crystal displays can be elevated by using compounds which have many carbon atoms in the portions of acyclic hydrocarbon existing in a side chain or bridge group. When N type compounds are used in the present invention, the total number of carbon atoms in the portions of acyclic hydrocarbon existing in a side chain or bridge group is preferably 6 to 16 in particular.

As the P type liquid crystalline compounds for AM-LCD, the compounds expressed by the following general formula (3) are preferable:

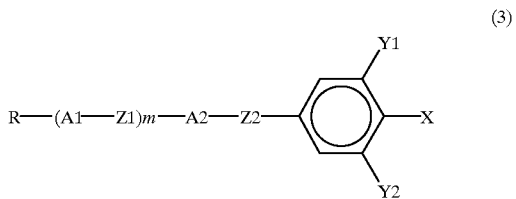

(3)

wherein R represents a chain group having 1 to 12 carbon atoms in the portion of hydrocarbon, A1 and A2 independently represent trans-1,4-cyclohexylene group, or 1,4-phenylene group which may be unsubstituted or lateral position of which may be substituted with fluorine, Z1 and Z2 independently represent single bond, or bridge group a main chain of which is composed of an even number of atoms, X represents —F, —Cl, —CF$_3$, —OCF$_3$, —OCHF$_2$, —OC$_2$F$_5$, or —OCF$_2$CHF$_2$, Y$_1$ and Y2 independently represent hydrogen atom or fluorine atom, and m is 0, 1, 2, or 3.

Preferable compounds used in the present invention are ones having a total number of carbon atoms of 4 to 24 hydrocarbon portion which exists in R, Z1 and Z2 are formed. From the viewpoint of maintaining the viscosity of liquid crystal compositions at a low level and securing a properly wide nematic temperature range, the total number of carbon atoms is more desirably 6 to 12.

When P type compounds expressed by general formula (3) are used as component of the liquid crystal compositions of the present invention, and if both Z1 and Z2 are single bond or a group which does not form the portion of hydrocarbon, for example, the followings are preferable as side chain corresponding to R:

Butyl group, pentyl group, hexyl group, heptyl group, octyl group, nonyl group, decyl group, butyloxy group, pentyloxy group, hexyloxy group, heptyloxy group, octyloxy group, nonyloxy group, decyloxy group;

trans-2-butenyl group, trans-2-pentenyl group, cis-2-penteny 1 group, trans-2-hexenyl group, cis-2-hexenyl group, trans-2-heptenyl group, cis-2-heptenyl group, trans-2-octenyl group, cis-2-octenyl group, trans-2-nonenyl group, cis-2-nonenyl group, trans-2-decenyl group, cis-2-decenyl group;

3-butenyl group, trans-3-pentenyl group, trans-3-hexenyl group, trans-3-heptenyl group, trans-3-octenyl group, trans-3-nonenyl group, trans-3-decenyl group;

4-pentenyl group, trans-4-hexenyl group, cis-4-hexenyl group, trans-4-heptenyl group, cis-4-heptenyl group, trans-4-octenyl group, cis-4-octenyl group, trans-4-nonenyl group, cis-4-nonenyl group, trans-4-decenyl group, cis-4-decenyl group;

5-hexenyl group, trans-5-heptenyl group, trans-5-octenyl group, trans-5-nonenyl group, trans-5-decenyl group;

trans-2-butenyloxy group, trans-2-pentenyloxy group, trans-2-hexenyloxy group, trans-2-heptenyloxy group, trans-2-octenyloxy group, trans-2-nonenyloxy group, trans-2-decenyloxy group;

3-butenyloxy group, trans-3-pentenyloxy group, cis-3-pentenyloxy group, trans-3-hexenyloxy group, cis-3-hexenyloxy group, trans-3-heptenyloxy group, cis-3-heptenyloxy group, trans-3-octenyloxy group, cis-3-octenyloxy group, trans-3-nonenyloxy group, cis-3-nonenyloxy group, trans-3-decenyloxy group, cis-3-decenyloxy group;

propyloxymethyl group, butyloxymethyl group, pentyloxymethyl group, hexyloxymethyl group, heptyloxymethyl group, octyloxymethyl group, nonyloxymethyl group, and decyloxymethyl group.

In the case where P type compounds expressed by general formula (3) wherein one of Z1 and Z2 is —CH$_2$CH$_2$—, and the other is single bond or a group which does not form the portion of hydrocarbon are used as a component of the liquid crystal compositions of the present invention, the following groups can be mentioned as preferable side chains corresponding to R, in addition to the groups mentioned above:

ethyl group, propyl group, ethoxy group, propyloxy group, allyl group, allyloxy group, methoxymethyl group, and ethoxymethyl group.

Also, when N type compounds are used as component of liquid crystal compositions of the present invention, it is preferable to use compounds which have any two of the groups exemplified above, in combination, as both side chains and which have a total number of carbon atoms of 4 to 24 in the portions of acyclic hydrocarbon in the molecule. From the viewpoint of assuring the viscosity of liquid crystal compositions at a low level and securing a properly wide nematic temperature range, the total number is more desirably 6 to 16.

From the viewpoint of practical use, in the liquid crystal compositions of the present invention, it is more preferable that the compositions have a CN point or SN point of −10° C. or lower and a NI point of 60° C. or higher, are composed of 7 or more liquid crystalline compounds, contain at least one compound expressed by general formula (1) and contain at least one compound having a total of 4 to 24 carbon atoms in the portions of acyclic hydrocarbon in an amount of 70% by weight or more, and that the average number of the total carbon atoms of the liquid crystalline compound in the compositions is 5 or more. The more the compositions contain the liquid crystalline compounds having a total number of carbon atoms of 4 to 24, the more the compositions are preferable.

Liquid crystal compositions of the present invention are produced by mixing two or more liquid crystalline compounds by a method which is conventional by itself. For instance, methods such as one wherein various liquid crystalline compounds and other components are dissolved with each other at a high temperature, and one wherein liquid crystalline compounds are dissolved in a solvent for the compounds and mixed, and then the solvent is distilled off at a reduced pressure are adopted. Also, the liquid crystal compositions of the present invention can be improved depending on intended uses with suitable additives to optimize.

It is a well known fact that when liquid crystal cells are prepared by filling a liquid crystal composition, the height of voltage holding ratio of liquid crystal cell is naturally influenced by the structure of liquid crystalline compounds. That is, voltage holding ratio varies with the type and number of the rings A, B, and C, bridge groups such as Z1 and Z2, and the combination of substituting groups such as X, Y1, and Y2 in general formula (1). It also varies with the combination and contents of liquid crystalline compounds in the liquid crystal compositions. Since, in the present invention, voltage holding ratio can be elevated with little effect to other physical properties by increasing the number of carbon atoms in the portions of the acyclic hydrocarbon even when the structure of constituent portions other than the acyclic hydrocarbon of the liquid crystalline compounds which form liquid crystal compositions are the same, the compounds are useful for the production of liquid crystal compositions for AM-LCD which requires an especially high voltage holding ratio.

Now, the present invention will be explained in more detail with reference to Examples and Comparative Examples. In these examples, a group of the liquid crystalline compounds expressed by general formula (1) wherein compounds having the same structure except mainly R1 are principally used to show the facts that voltage holding ratio (VHR) is elevated by the increase of carbon number in R1 and other portions of acrylic hydrocarbin and that liquid crystal compositions which have a high voltage holding ratio and are excellent in other physical properties can be formed by combining the compounds having as long R1 group as possible, together.

Further, the average total number of carbon atoms in the portions of acyclic hydrocarbon (hereinafter referred to as average alkyl chain length) of compounds which constitute a liquid crystal composition was calculated by the following equation wherein the total number of carbon atoms in the portions of acyclic hydrocarbon of Compound No. i in the order which forms a composition in an example was assumed as Ni, and the content of the compound No. i constituting the composition was assumed as Xi:

$$\text{Average alkyl chain length} = \Sigma(N_i \cdot X_i)$$

Measurement of voltage holding ratio was conducted according to the method described in Tatsuo SHIMAZAKI et al., Voltage Holding Properties of TFT-LCD I, Preliminary Manuscripts of Lectures in the Proceedings of Fourteenth Conference on Liquid Crystals held in Japan, p 78 (1988). That is, first, a polyimide aligning film was subjected to a rubbing for alignment treatment on a glass substrate on which an ITO pattern having an electrode area of 1 cm² had been deposited by a vacuum evaporation, a liquid crystal composition for evaluation was filled in a test cell prepared by adhering the glass substrates seperated by a spacer of 7 $\mu$m thick, and a filling hole was sealed with a UV curing type sealant. Then, the test cell was set in a sealed box (a part of test system) set up in a constant temperature bath (PU-1S Model; product of Tabai Especk Co.) maintained at 100° C., allowed to stand for sufficient period of time after the inside of the bath reached a prescribed temperature, signals having a frame frequency of 30 Hz, at a voltage of 5.0 V and pulse width of 60 microseconds were applied to the test cell by using a test system for the voltage holding ratio of liquid crystals (VHR-1S Model; product of Toyo Co.) to determine the voltage holding ratio. Voltage holding ratio thus determined was calculated, by an analytical software of a computer which forms the test system, as an average value of voltage holding ratios at the time when a (+) wave was applied and at the time when a (-) wave was applied, respectively.

In the evaluation of voltage holding ratio of liquid crystal compositions for AM-LCD, the reasons why the test temperature was set for 100° C. are that even when there is no difference in voltage holding ratio at around room temperatures, difference in the voltage holding ratio appears at 100° C., that the higher voltage holding ratio liquid crystal compositions have at a high temperature of 100° C., the fewer defect of display appear at operation aging tests at a high temperature, and that this difference in the voltage holding ratio is closely related with the results of operation aging tests at a high temperature (Kei SASAKI et al., Nematic Liquid Crystal Materials for TFT-LCD and Their Display Properties, Preliminary Manuscripts of Lectures on the Proceedings of Seventeenth Conference on Liquid Crystals held in Japan, p 184 (1991). In other words, the evaluation for clarifying the superiority or inferiority of liquid crystal compositions for AM-LCD can satisfactorily be achieved by determining the voltage holding ratio at 100° C. without a need to conduct even operation aging tests at a high temperature which take much time and a great expense. That is, it can be said that the higher voltage holding ratio liquid crystal compositions give, the longer life and the better quality the compositions have when formed into liquid crystal display devices.

In the following Examples, liquid crystalline compounds are shown by the abbreviations as follows:

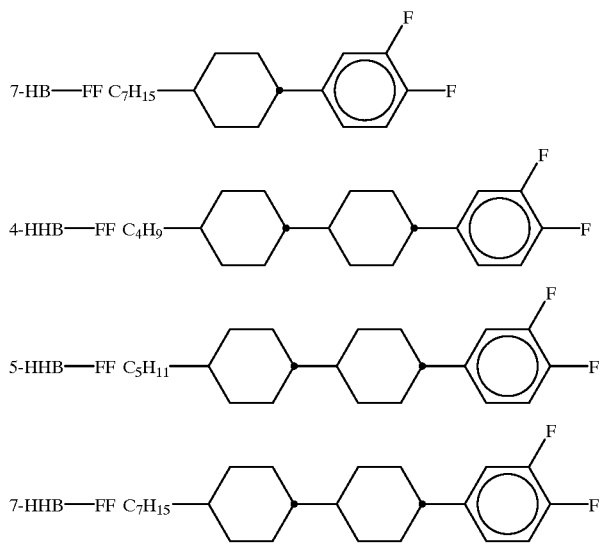

-continued
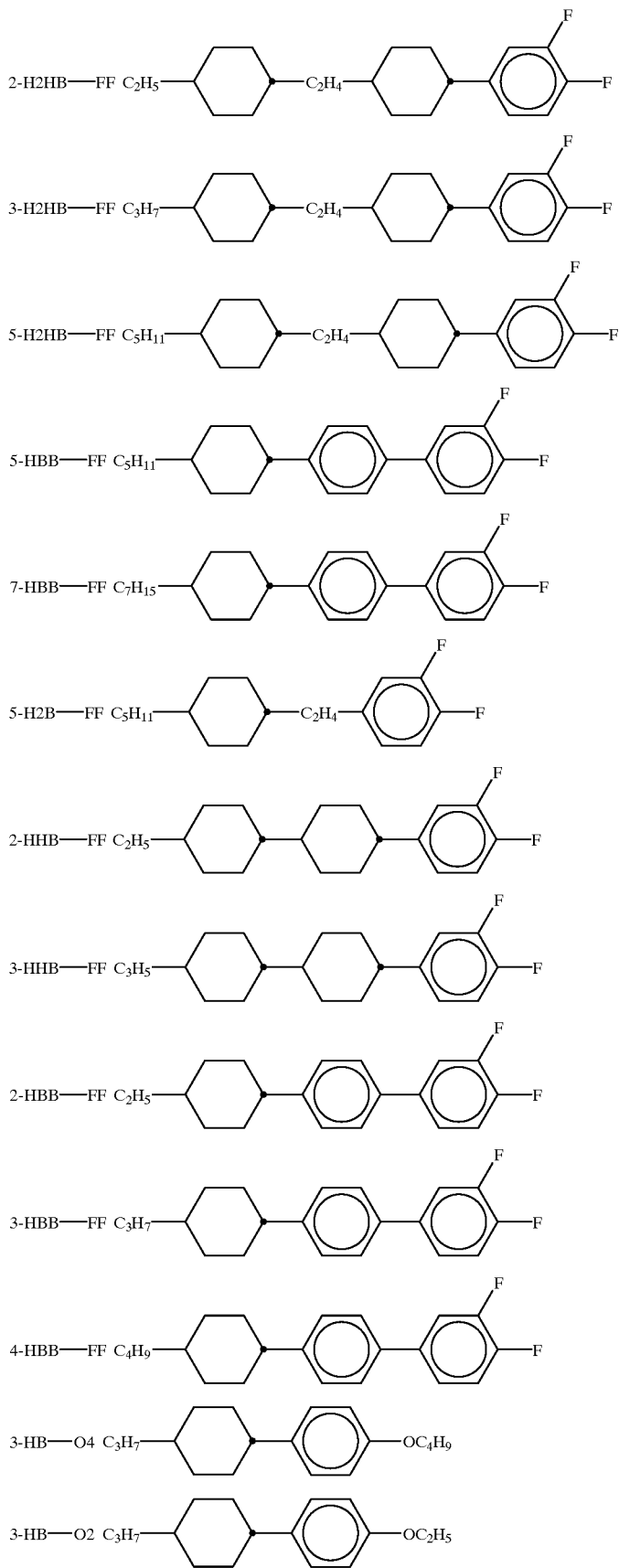

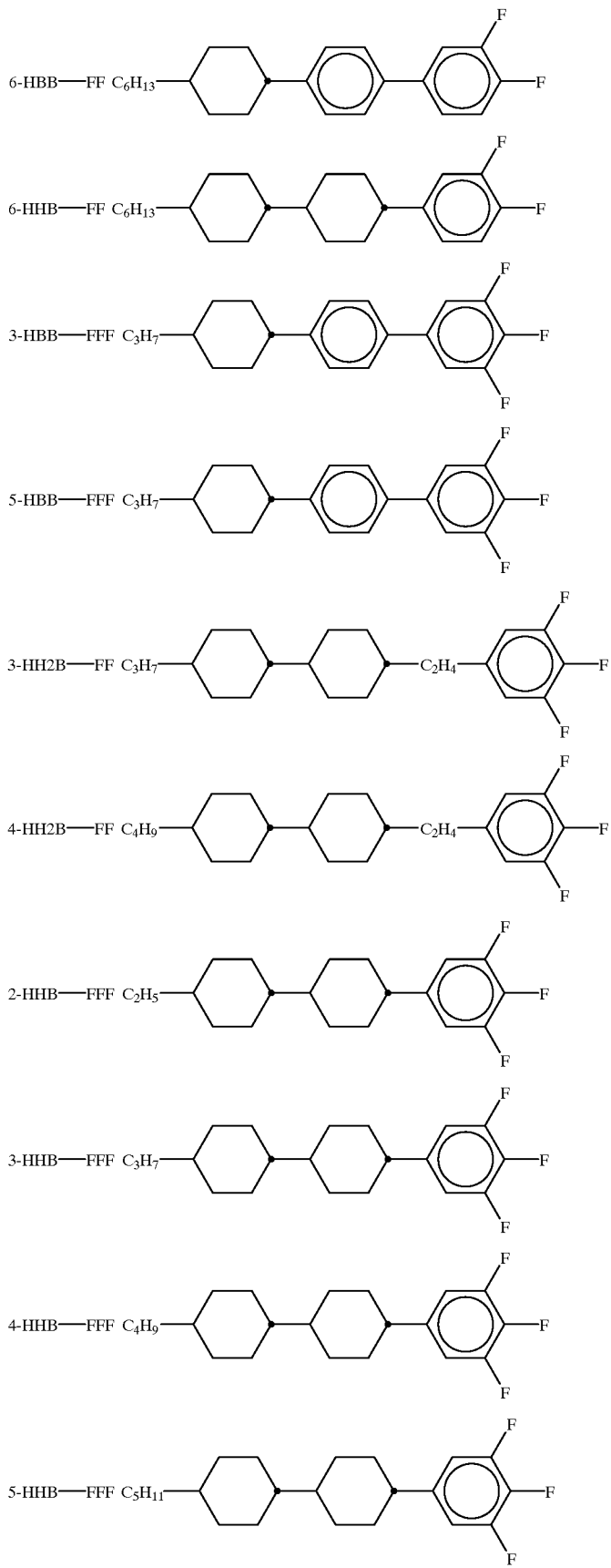

-continued
2-H2HB—FFF C₂H₅—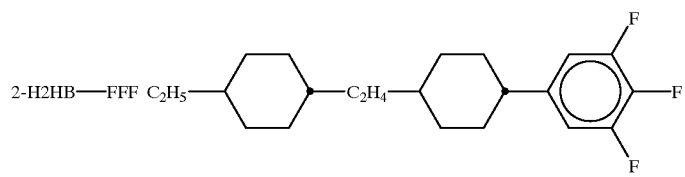
3-H2HB—FFF C₃H₇—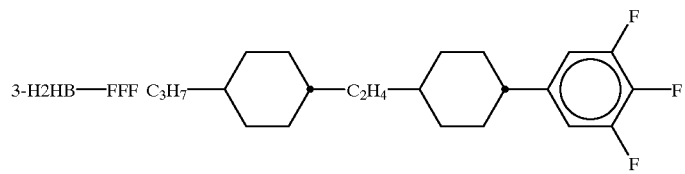
4-H2HB—FFF C₄H₉—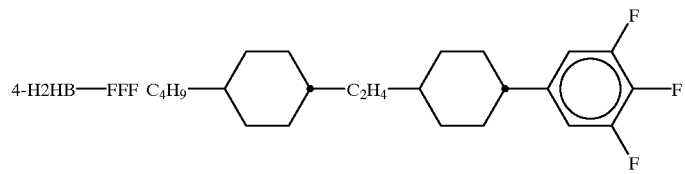
5-H2HB—FFF C₅H₁₁—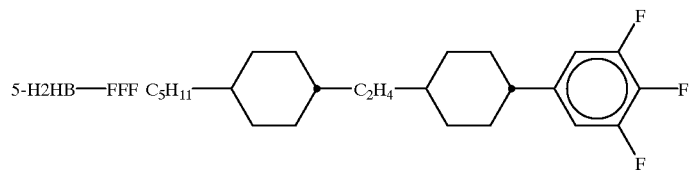
3-HH-4 C₃H₇—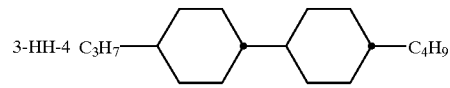—C₄H₉
3-HH-5 C₃H₇—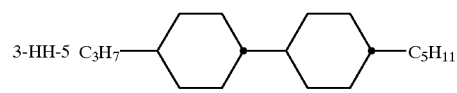—C₅H₁₁
7-HB—FFF C₇H₁₅—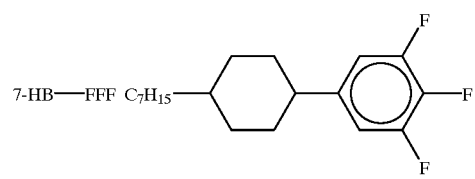
5-HB—Cl C₅H₁₁—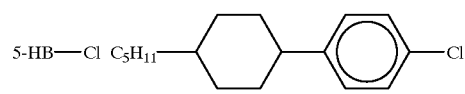—Cl
7-HB—Cl C₇H₁₅—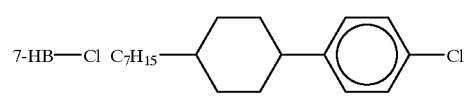—Cl
2-HHB—OCF3 C₂H₅—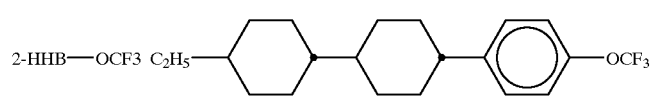—OCF₃

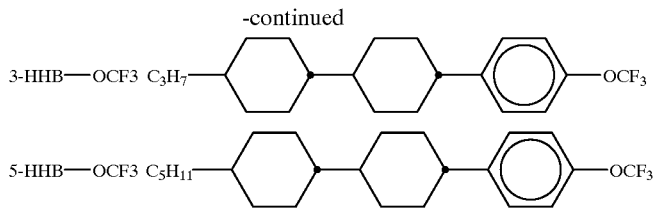

EXAMPLE 1

| Composition 1 | |
|---|---|
| 7-HB-FF | 13.0% by weight |
| 4-HHB-FF | 15.0% by weight |
| 5-HHB-FF | 15.0% by weight |
| 7-HHB-FF | 10.0% by weight |
| 2-H2HB-FF | 9.6% by weight |
| 3-H2HB-FF | 4.8% by weight |
| 5-H2HB-FF | 9.6% by weight |
| 5-HBB-FF | 15.0% by weight |
| 7-HBB-FF | 8.0% by weight |

Average alkyl chain length: 5.57
Physical properties of Composition 1 are shown below:

| | |
|---|---|
| VHR (100° C.) | 95.0% (Voltage holding ratio at 100° C.) |
| SN point | <−40° C. |
| NI point | 86° C. |
| Viscosity (20° C.) | 24 cp |
| Optical anisotropy | 0.086 |
| Dielectric anisotropy | 4.8 |
| Threshold voltage ($V_{10}$) | 2.2 volt |
| Specific resistance (25° C.) | $2 \times 10^{14}$ Ωcm |

Comparative Example 1

| Composition 2 | |
|---|---|
| 5-H2B-FF | 9.00% by weight |
| 2-HHB-FF | 16.67% by weight |
| 3-HHB-FF | 16.67% by weight |
| 5-HHB-FF | 16.67% by weight |
| 2-H2HB-FF | 8.40% by weight |
| 3-H2HB-FF | 4.20% by weight |
| 5-H2HB-FF | 8.40% by weight |
| 2-HBB-FF | 5.00% by weight |
| 3-HHB-FF | 5.00% by weight |
| 5-HBB-FF | 10.00% by weight |

Average alkyl chain length: 4.18
Physical properties of Composition 2 are shown below:

| | |
|---|---|
| VHR (100° C.) | 94.0% |
| SN point | <−40° C. |
| NI point | 86° C. |
| Viscosity (20° C.) | 25 cp |
| Optical anisotropy | 0.086 |
| Dielectric anisotropy | 4.8 |
| Threshold voltage ($V_{10}$) | 2.2 volt |
| Specific resistance (25° C.) | $2 \times 10^{14}$ Ωcm |

Average alkyl chain length and voltage holding ratio, VHR (100° C.) determined for the compositions in Examples and Comparative Examples are shown in Table 1 together.

TABLE 1

| Composition No. | Example No. | Average alkyl chain length | VHR (100° C.) |
|---|---|---|---|
| 1 | Example 1 | 5.57 | 95.0 |
| 2 | Comparative Example 1 | 4.18 | 94.0 |
| 3 | Example 2 | 5.33 | 97.0 |
| 4 | Comparative Example 2 | 3.33 | 95.7 |
| 5 | Example 3 | 5.75 | 95.2 |
| 6 | Comparative Example 3 | 3.75 | 92.0 |
| 7 | Example 4 | 5.4 | 97.2 |
| 8 | Comparative Example 4 | 3.4 | 95.9 |
| 9 | Example 5 | 6.2 | 97.4 |
| 10 | Comparative Example 5 | 5.2 | 96.0 |

Composition 2 contained many compounds having a small number of carbon atoms at the portion of acyclic hydrocarbon compared with Composition 1 (whereas the average alkyl chain length of Composition 1 was 5.57, the average alkyl chain length of Composition 2 was 4.18). As the result, it can be seen that Composition 1 was more excellent than Composition 2 by 1% in VHR (100° C.). With respect to nematic temperature range, viscosity, optical anisotropy, dielectric anisotropy, threshold voltage, and specific resistance, both compositions exhibited the same extent of values.

EXAMPLE 2

| Composition 3 | |
|---|---|
| 4-HHB-FF | 1.00 part by weight |
| 5-HHB-FF | 1.00 part by weight |
| 7-HHB-FF | 1.00 part by weight |

Composition 3 had a VHR (100° C.) of 97.0%.

Comparative Example 2 (Comparative Example to Example 2)

| Composition 4 | |
|---|---|
| 2-HHB-FF | 1.00 part by weight |
| 3-HHB-FF | 1.00 part by weight |
| 5-HHB-FF | 1.00 part by weight |

Composition 4 had a VHR (100° C.) of 95.7%.

From Table 1, it can be seen that whereas the average alkyl chain length of Composition 3 was 5.33, the average alkyl chain length of Composition 4 was 3.33, and that Composition 3 comprising compounds having a large number of carbon atoms in the portions of acyclic hydrocarbon (in this case, alkyl group) had remarkably higher voltage holding ratio than that of Composition 4 comprising compounds having a small number of carbon atoms in the portions of acyclic hydrocarbon, and thus the former is preferable.

EXAMPLE 3

| Composition 5 | |
|---|---|
| 4-HBB-FF | 1.00 part by weight |
| 5-HBB-FF | 1.00 part by weight |
| 7-HBB-FF | 2.00 parts by weight |

Composition 5 had a VHR (100° C.) of 95.2%.

Comparative Example 3 (Comparative Example to Example 3)

| Composition 6 | |
|---|---|
| 2-HBB-FF | 1.00 part by weight |
| 3-HBB-FF | 1.00 part by weight |
| 5-HBB-FF | 2.00 parts by weight |

Composition 6 had a VHR (100° C.) of 92.0%. From Table 1, it can be seen that whereas the average alkyl chain length of Composition 5 was 5.75, the average alkyl chain length of Composition 6 was 3.75, and that Composition 6 comprising compounds having a large number of carbon atoms in the portions of acyclic hydrocarbon (in this case, alkyl group) had higher voltage holding ratio than that of Composition 6 comprising compounds having a small number of carbon atoms in the portions of acyclic hydrocarbon, and thus the former is preferable.

EXAMPLE 4

| Composition 7 | |
|---|---|
| 2-H2HB-FF | 2.00 parts by weight |
| 3-H2HB-FF | 1.00 part by weight |
| 5-H2HB-FF | 2.00 parts by weight |

Composition 7 had a VHR (100° C.) of 97.2%.

Comparative Example 4 (Comparative Example to Example 4)

| Composition 8 | |
|---|---|
| 2-HHB-FF | 2.00 parts by weight |
| 3-HHB-FF | 1.00 part by weight |
| 5-HHB-FF | 2.00 parts by weight |

Composition 8 had a VHR (100° C.) of 95.9%. Difference in chemical structure between the compounds which constitute Composition 7 shown in Example 4 and the compounds which constitute Composition 8 lay in the bonding group which bonds a ring with another ring (in this case, ethylene group versus single bond). Also, from Table 1, it can be seen that whereas the average alkyl chain length of Composition 7 was 5.4, the average alkyl chain length of Composition 8 was 3.4, and that Composition 7 comprising compounds having a large number of carbon atoms in the portions of acyclic hydrocarbon had higher voltage holding ratio than Composition 8 comprising compounds having a small number of carbon atoms in the portions of acyclic hydrocarbon, and thus the former is preferable.

EXAMPLE 5

| Composition 9 | |
|---|---|
| 2-H2HB-FF | 2.00 parts by weight |
| 3-H2HB-FF | 1.00 part by weight |
| 5-H2HB-FF | 2.00 parts by weight |
| 3-HB-O4 | 5.00 parts by weight |

Composition 9 had a VHR (100° C.) of 97.4%.

EXAMPLE 6

| Composition 10 | |
|---|---|
| 2-H2HB-FF | 2.00 parts by weight |
| 3-H2HB-FF | 1.00 part by weight |
| 5-H2HB-FF | 2.00 parts by weight |
| 3-HB-O2 | 5.00 parts by weight |

Composition 10 had a VHR (100° C.) of 96.0%.

Whereas Composition 9 comprised 5 parts by weight of 3-HB-O4, Composition 10 comprised 5 parts by weight of 3-HB-O02. That is, the difference between Composition 9 and Composition 10 was that the compositions comprised a compound having butoxy group or comprised a compound having ethoxy group. Also, from Table 1, it can be seen that whereas the average alkyl chain length of Composition 9 was 6.2, the average alkyl chain length of Composition 10 was 5.2, and that when the total number of carbon atoms in the portion of acyclic hydrocarbon is 5 or more, the larger the total number is, the higher voltage holding ratio the composition has, and thus the former is preferable.

EXAMPLE 7

| Composition 11 | |
|---|---|
| 3-HB-O2 | 1.00 part by weight |
| 3-HB-O4 | 1.00 part by weight |

Composition 11 had an average alkyl chain length of 6.0 and a VHR (100° C.) of 96.5%.

EXAMPLES 8 THROUGH 33 AND COMPARATIVE EXAMPLES 6 THROUGH 13

Average alkyl chain length and VHR (100° C.) of the compositions prepared by mixing 30 to 50% by weight of a liquid crystalline compound shown in Table 2 with Composition 11 in Example 7 (mixture of 3-HB-O2 and 3-HB-O4 in the same amount) are shown in Table 2.

TABLE 2

| Composition No. | Example No. | Added liquid crystalline compound | Concentration (% by weight) | Average alkyl chain length | VHR (100° C.) |
|---|---|---|---|---|---|
| 12 | Comparative Example 6 | 2-HBB-FF | 40 | 4.4 | 94.1 |
| 13 | Comparative Example 7 | 3-HBB-FF | 40 | 4.8 | 94.6 |
| 14 | Example 8 | 4-HBB-FF | 40 | 5.2 | 95.5 |
| 15 | Example 9 | 5-HBB-FF | 40 | 5.6 | 95.9 |
| 16 | Example 10 | 6-HBB-FF | 40 | 6.0 | 96.2 |
| 17 | Example 11 | 7-HBB-FF | 40 | 6.4 | 96.7 |
| 18 | Comparative Example 8 | 2-HHB-FF | 40 | 4.4 | 95.0 |
| 19 | Comparative Example 9 | 3-HHB-FF | 40 | 4.8 | 95.9 |
| 20 | Example 12 | 4-HHB-FF | 40 | 5.2 | 96.7 |
| 21 | Example 13 | 5-HHB-FF | 40 | 5.6 | 97.1 |
| 22 | Example 14 | 6-HHB-FF | 40 | 6.0 | 97.3 |
| 23 | Example 15 | 7-HHB-FF | 40 | 6.4 | 97.8 |
| 24 | Comparative Example 10 | 3-HBB-FFF | 50 | 4.5 | 95.1 |
| 25 | Example 16 | 5-HBB-FFF | 50 | 5.5 | 96.4 |
| 26 | Example 17 | 3-HH2B-FFF | 50 | 5.5 | 96.4 |
| 27 | Example 18 | 4-HH2B-FFF | 50 | 6.0 | 96.7 |
| 28 | Comparative Example 11 | 2-HHB-FFF | 50 | 4.0 | 95.3 |
| 29 | Comparative Example 12 | 3-HHB-FFF | 50 | 4.5 | 96.2 |
| 30 | Example 19 | 4-HHB-FFF | 50 | 5.0 | 96.6 |
| 31 | Example 20 | 5-HHB-FFF | 50 | 5.5 | 97.2 |
| 32 | Example 21 | 2-H2HB-FFF | 50 | 5.0 | 97.1 |
| 33 | Example 22 | 3-H2HB-FFF | 50 | 5.5 | 97.2 |
| 34 | Example 23 | 4-H2HB-FFF | 50 | 6.0 | 97.5 |
| 35 | Example 24 | 5-H2HB-FFF | 50 | 6.5 | 97.6 |
| 36 | Example 25 | 3-HH-4 | 40 | 6.4 | 98.0 |
| 37 | Example 26 | 3-HH-5 | 40 | 6.8 | 98.1 |
| 38 | Example 27 | 7-HB-FF | 50 | 6.5 | 97.0 |
| 39 | Example 28 | 5-H2B-FF | 50 | 6.5 | 97.0 |
| 40 | Example 29 | 7-HB-FFF | 50 | 6.5 | 97.1 |
| 41 | Example 30 | 5-HBCl | 50 | 5.5 | 97.0 |
| 42 | Example 31 | 7-HB-Cl | 50 | 6.5 | 98.2 |
| 43 | Comparative Example 13 | 2-HHB-OCF3 | 30 | 4.8 | 94.9 |
| 44 | Example 32 | 3-HHB-OCF3 | 30 | 5.1 | 95.8 |
| 45 | Example 33 | 5-HHB-OCF3 | 30 | 5.7 | 96.9 |

Compositions 12 through 17 are examples of a group of compounds in which the added compounds are expressed by general formula (1) wherein R1 is an alkyl group having 2 to 7 carbon atoms, A is trans-1,4-cyclohexylene, a is 1, b is 0, Z1 and Z2 are single bond, C is 1,4-phenylene, c is 1, X and Y1 are F, and Y2 is H. It can be seen that when the average alkyl chain length is 5 or more, VHR (100° C.) becomes higher as the number of carbon atoms in R1 increases.

Compositions 18 through 23 are examples of a group of compounds in which the added compounds are expressed by general formula (1) wherein R1 is an alkyl group having 2 to 7 carbon atoms, A and B are trans-1,4-cyclohexylene, a is 1, b is 1, Z1 and Z2 are single bond, c is 0, X and Y1 are F, and Y2 is H. It can be seen that when the average chain length of alkyl groups is 5 or more, VHR (100° C.) becomes higher as the number of carbon atoms in R1 increases.

Compositions 24 and 25 are examples of a group of compounds in which the added compounds are expressed by general formula (1) wherein R1 is an alkyl group having 2 to 5 carbon atoms, A is trans-1,4-cyclohexylene, a is 1, b is 0, Z1 and Z2 are single bond, C is 1,4-phenylene, c is 1, and X, Y1, and Y2 are F. It can be seen that when the average chain length of alkyl groups is 5 or more, VHR (100° C.) becomes higher as the number of carbon atoms in R1 increases.

Compositions 26 and 27 are examples of a group of compounds in which the added compounds are expressed by general formula (1) wherein R1 is an alkyl group having 3 to 4 carbon atoms, A and B are trans-1,4-cyclohexylene, a is 1, b is 1, Z1 is single bond, Z2 is $CH_2CH_2$, c is 0, and X, Y1, and Y2 are F. It can be seen that when the average chain length of alkyl groups is 5 or more, VHR (100° C.) becomes higher as the number of carbon atoms in R1 increases.

Compositions 28 through 31 are examples of a group of compounds in which the added compounds are expressed by general formula (1) wherein R1 is an alkyl group having 2 to 5 carbon atoms, A and B are trans-1,4-cyclohexylene, a is 1, b is 1, Z1 and Z2 are single bond, c is 0, X and Y1 are F, and Y2 is H. It can be seen that while the group of these compounds exhibit a considerably high VHR value even when they have a small average alkyl chain length, particularly when the average chain length of alkyl groups is 5 or more, VHR (100° C.) becomes remarkably higher as the number of carbon atoms in R1 increases.

Compositions 32 through 35 are examples of a group of compounds in which the added compounds are expressed by general formula (1) wherein R1 is an alkyl group having 2 to 5 carbon atoms, A and B are trans-1,4-cyclohexylene, a is 1, b is 1, Z1 is $CH_2CH_2$, Z2 is single bond, c is 0, and X, Y1, and Y2 are F. It can be seen that when the average chain length of alkyl groups is 5 or more, VHR (100° C.) becomes high as the number of carbon atoms in R1 increases.

Compositions 26 and 27 were different when compared with Composition 29 and 30 only in the point that Z2 in general formula (1) by which the added compounds are expressed was single bond or $CH_2CH_2$. It can be seen that whereas Composition 26 had the same R1 with Composition 29, and Composition 27 with Composition 30, respectively, the total number of carbon atoms in the positions of acyclic hydrocarbon in the formers became larger by 2 due to the difference at the position of Z2, and VHR (100° C.) became higher, respectively.

Compositions 32 through 35 were different when compared with Compositions 28 through 31 only in the point that Z1 in general formula (1) by which the added compounds are expressed was single bond or $CH_2CH_2$. It can be seen that whereas Composition 32 had the same R1 in respective added compounds with Composition 28, Composition 33 with Composition 29, Composition 34 with Composition 30, and Composition 35 with Composition 31, the total number of carbon atoms in the portion of acyclic hydrocarbon in the formers became larger by 2 due to the difference at the portion of Z2, and VHR (100° C.) became higher to that extent.

The fact to which attention should like to be paid is that the difference between Compositions 32 to 35 and Compositions 28 to 31 in VHR (100° C.) was remarkably larger than the difference between Compositions 26 and 27 and Compositions 29 and 30 in VHR (100° C.). This fact indicates that in polycyclic compounds having two or more rings, compounds which have a bridge group selected from acyclic hydrocarbons such as $CH_2CH_2$ at a position as close as possible to a long chain alkyl group R1 have higher VHR. That is, speaking with reference to general formula (1), when a $\geq 1$ and Z1 is a bridge group selected from acyclic compounds such as $CH_2CH_2$, the smaller a is, the higher VHR becomes.

Compositions 36 and 37 are examples of a group of compounds in which the added compounds are expressed by general formula (1) wherein R1 is an alkyl group having 3 carbon atoms, A is trans-1,4-cyclohexylene, a is 2, b is 0, Z1 and Z2 are single bond, c is 0, X is an alkyl group having 4 or 5 carbon atoms, and Y1 and Y2 are H. It can be seen that the average alkyl chain length of these compounds was 5 or more, and VHR (100° C.) became higher as the number of carbon atoms in X increases.

Compositions 39 was different, when compared with Composition 38, only in the point that R1 and Z1 in general formula (1) by which the added compounds are expressed were single bond or CH$_2$CH$_2$. It can be seen that whereas Composition 39 had smaller number of carbon atoms by 2 in R1, but larger number of carbon atoms by 2 in the portion of Z1 of the added compound than Composition 38, and thus number of carbon atoms in the portions of acyclic hydrocarbon was the same, and that VHR (100° C.) of both compositions became equal.

Compositions 41 and 42 are examples of a group of compounds in which the added compounds are expressed by general formula (1) wherein R1 is an alkyl group having 5 to 7 carbon atoms, A is trans-1,4-cyclohexylene, a is 1, b is 0, Z1 and Z2 are single bond, c is 0, X is Cl, and Y1 and Y2 are H. It can be seen that the average alkyl chain length of these compositions was 5 or more, and VHR (100° C.) becomes higher as the number of carbon atoms in R1 increases.

Compositions 43 through 45 are examples of a group of compounds in which the added compounds are expressed by general formula (1) wherein R1 is an alkyl group having 2 to 5 carbon atoms, A and B are trans-1,4-cyclohexylene, a is 1, b is 1, Z1 and Z2 are single bond, c is 0, X is OCF3, and Y1 and Y2 are H. It can be seen that the average chain length of alkyl groups of these compositions was 5 or more, and VHR (100° C.) becomes higher as the number of carbon atoms in R1 increases.

With respect to Compositions 12 through 45 mentioned above, the relationship between the average alkyl chain length and voltage holding ratio VHR (100° C.) was plotted as shown in FIG. 1. From FIG. 1, it can be understood that if liquid crystalline compounds were selected so that the total number of carbon atoms in the portions of acyclic hydrocarbon (in this case, alkyl group) in the compounds which constitute the composition, namely, the average alkyl chain length of becomes large, VHR of the compositions can proportionately be raised. Accordingly, for instance, if a relationship with VHR as shown in FIG. 1 was obtained in advance by using the total number of carbon atoms (average alkyl chain length in FIG. 1) in the portion of acyclic hydrocarbon of liquid crystalline compounds in liquid crystal compositions as a parameter, liquid crystal compositions having a desired VHR can be obtained by changing only the average alkyl chain length without changing other physical properties so much. This is useful for designing liquid crystal compositions for AM-LCD of which a particularly high voltage holding ratio is required.

Industrial Applicability

By using the liquid crystal compositions of the present invention, liquid crystal displays (particularly AM-LCD) having a higher voltage holding ratio than that of conventional ones can be achieved.

We claim:

1. A process for producing a liquid crystal composition comprising steps of:

(a) selecting liquid crystalline compounds and their content by using, as a parameter, the number of carbon atoms in the portions of acyclic hydrocarbon in liquid crystalline compounds from which said liquid crystal composition is composed, in the range wherein the total number of carbon atoms in the portions of acyclic hydrocarbon in the liquid crystalline compounds is 4 to 24, and the average value of the total number of carbon atoms in the portions of acyclic hydrocarbon in the liquid crystalline compounds in the liquid crystal composition is 5 or more, so that the voltage holding ratio of a cell of said liquid crystal is a prescribed value or higher when the cell of said liquid crystal was prepared by filling said liquid crystal composition, and (b) combining said liquid crystalline compounds.

2. The process for producing a liquid crystal composition according to claim 1 wherein said liquid crystalline compounds are selected from the compounds expressed by the following general formula (4), and its content is 70% by weight or more

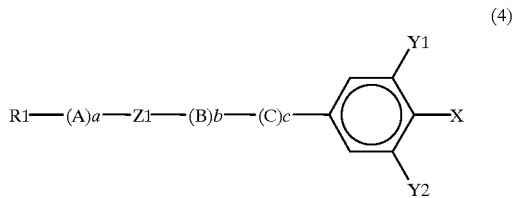

wherein Rl represents an alkyl group or alkoxy group having 4 to 24 carbon atoms; A, B, and C independently represent 1,4-phenylene, trans-1,4-cyclohexylene, 1,3-dioxane-2,5-diyl, pyrimidine-2,5-diyl, or pyridine-2,5-diyl provided that when A, B, and C are 1,4-phenylene, 1 to 4 hydrogen atoms of which may independently be substituted with F, Cl, OCF$_3$, or CF$_3$; a, b, and c are independently an integer of 0 to 3 provided that a+b+c$\leq$3; Z1 and Z2 independently represent single bond, —COO—, —CH$_2$CH$_2$—, or —C≡C—; X represents F, Cl, O(CH$_2$)$_n$CH$_l$F$_{3-l}$, (CH$_2$)$_n$CH$_l$F$_{3-l}$, or an alkyl or alkyloxy group having 1 to 24 carbon atoms provided that n is an integer of 0 to 4, and l is an integer of 0 to 2; and Y1 and Y2 independently represent H, F, or Cl.

* * * * *